(12) United States Patent
Wallen

(10) Patent No.: US 8,096,799 B2
(45) Date of Patent: Jan. 17, 2012

(54) SWEPT LEG SPIDER FOR AN EXTRUSION APPARATUS

(75) Inventor: John Michael Wallen, Lindsborg, KS (US)

(73) Assignee: American Maplan Corporation, McPherson, KS (US)

(*) Notice: Subject to any disclaimer, the term of this patent is extended or adjusted under 35 U.S.C. 154(b) by 467 days.

(21) Appl. No.: 12/335,904

(22) Filed: Dec. 16, 2008

(65) Prior Publication Data

US 2009/0160083 A1   Jun. 25, 2009

Related U.S. Application Data

(60) Provisional application No. 61/015,982, filed on Dec. 21, 2007.

(51) Int. Cl.
*B29C 47/20* (2006.01)

(52) U.S. Cl. ............ 425/192 R; 425/380; 425/467

(58) Field of Classification Search ........... 425/133.1, 425/191, 192 R, 380, 381, 467
See application file for complete search history.

(56) References Cited

U.S. PATENT DOCUMENTS

| | | | |
|---|---|---|---|
| 1,679,545 A | 8/1928 | Roth | |
| 1,809,837 A | 6/1931 | Ewart | |
| 2,363,261 A | 11/1944 | Ritter | |
| 2,574,555 A * | 11/1951 | Galloway | 425/192 R |
| 2,817,113 A | 12/1957 | Fields | |
| 3,649,148 A * | 3/1972 | Waltman et al. | 425/192 R |
| 4,076,481 A | 2/1978 | Sansone | |
| 4,711,623 A | 12/1987 | Gross et al. | |
| 4,725,467 A | 2/1988 | Groh et al. | |
| 4,731,216 A | 3/1988 | Topolski | |
| 4,789,327 A | 12/1988 | Chan et al. | |
| 5,474,722 A | 12/1995 | Woodhams | |
| 6,056,528 A | 5/2000 | Lupke et al. | |
| 6,485,283 B1 | 11/2002 | Yamaguchi et al. | |
| 7,077,639 B2 | 7/2006 | Dohmann et al. | |
| 2005/0206031 A1 | 9/2005 | Groeblacher et al. | |
| 2007/0190201 A1 | 8/2007 | Irwin | |

FOREIGN PATENT DOCUMENTS

| | | |
|---|---|---|
| JP | 54-14470 | 2/1979 |
| JP | 56-123833 | 9/1981 |
| JP | 2001 096601 | 4/2001 |

* cited by examiner

*Primary Examiner* — Yogendra Gupta
*Assistant Examiner* — Joseph Leyson
(74) *Attorney, Agent, or Firm* — Hamilton, Brook, Smith & Reynolds, P.C.

(57) ABSTRACT

A spider for an extrusion apparatus located upstream from a die, through which a profile is extruded. The spider can have an outer housing with a central flow passage therethrough. An inner hub can be positioned within the central passage for supporting an inner portion of the die. At least one spider leg can be secured to the outer housing and the inner hub, and support the inner hub within the central passage. The at least one spider leg can recess radially rearwardly outwardly in the downstream direction such that molten polymer flowing through the central passage flows around the at least one spider leg, separating and rejoining together earlier in inner radial regions close to the inner hub than in outer radial regions close to the outer housing for reducing spider lines on inside surfaces of extruded profiles.

6 Claims, 5 Drawing Sheets

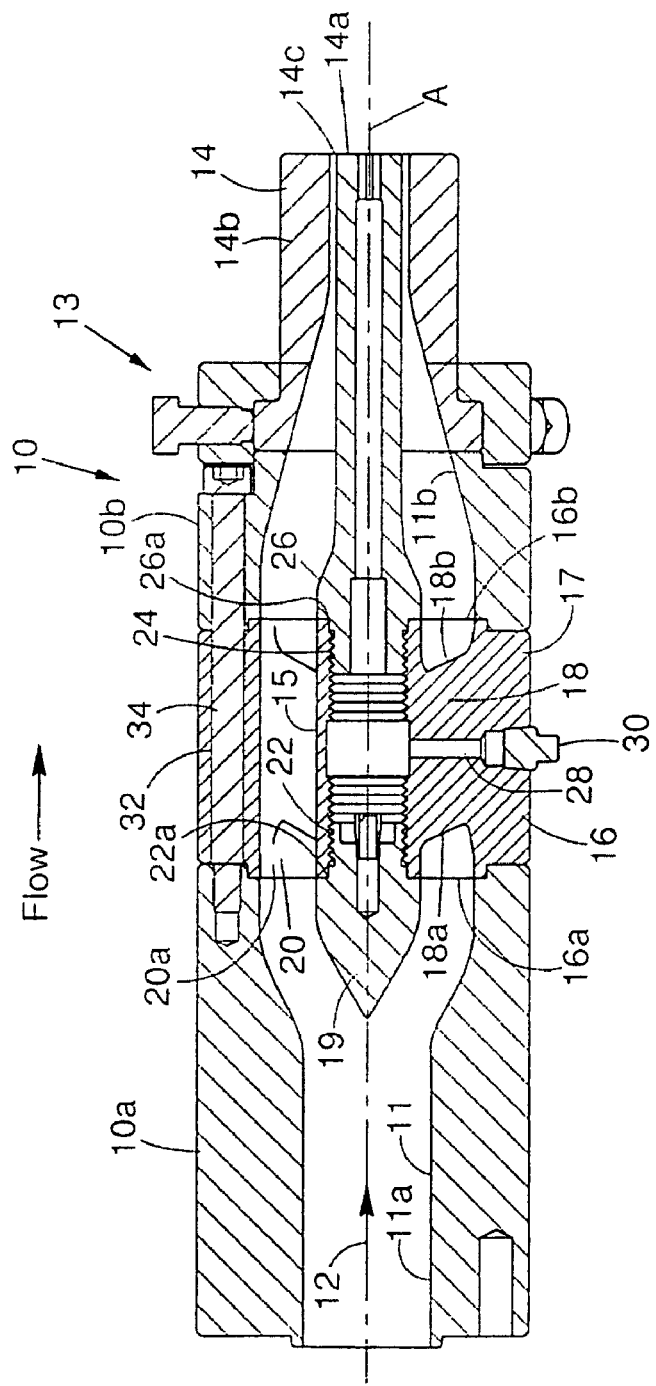
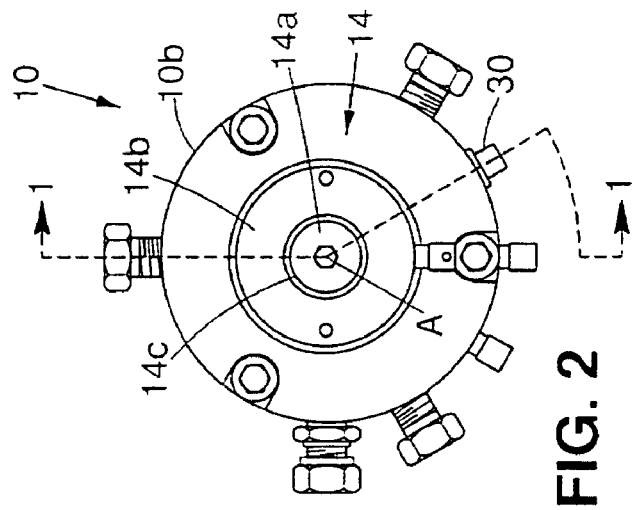
FIG. 1
FIG. 2

SWEPT LEG SPIDER FOR AN EXTRUSION APPARATUS

RELATED APPLICATION

This application claims the benefit of U.S. provisional application No. 61/015,982, filed on Dec. 21, 2007. The entire teachings of the above application are incorporated herein by reference.

BACKGROUND

In the prior art, when extruding plastic pipe with an extrusion die having inner and outer die portions, the inner die portion is typically secured to a central or inner hub of a spider pipe. The central hub is supported within the spider pipe by straight spider webs or legs. Polymer flowing through the spider pipe towards the dies must flow around the spider legs, separating at the upstream side of the spider legs and then rejoining together at the downstream side. In some situations, the polymer rejoins together in an incomplete manner, resulting in weld or spider lines on the inside of the pipe when extruded, and making the wall thickness of the pipe uneven. The wall thickness of the pipe is thinner along the weld or spider lines, and thicker in the regions between the spider lines.

SUMMARY

The present invention provides a spider or spider pipe for an extrusion apparatus that can be located upstream from a die for extruding profiles such as pipe, and can have a configuration that can reduce spider lines within extruded profiles or pipe.

The spider can have an outer housing with a central flow passage therethrough. An inner hub can be positioned within the central passage for supporting an inner portion of the die. At least one spider leg can be secured to the outer housing and the inner hub, and support the inner hub within the central passage. The at least one spider leg can recess radially rearwardly outwardly in the downstream direction such that molten polymer flowing through the central passage flows around the at least one spider leg, separating and rejoining together earlier in inner radial regions close to the inner hub than in outer radial regions close to the outer housing for reducing spider lines on inside surfaces of extruded profiles.

In particular embodiments, the at least one spider leg can recess radially rearwardly outwardly in a configuration to separate and rejoin molten polymer starting earlier in the inner radial regions and subsequently progressively continuing moving radially outward to the outer radial regions. The at least one spider leg can have upstream and downstream edges which are angled radially rearwardly outwardly in the downstream direction at the same angle relative to a flow direction axis. The at least one spider leg can have a longitudinal flow direction length between the angled upstream and downstream edges that is generally constant at any radial location of the at least one spider leg. The upstream and downstream edges can be pointed for reduced flow resistance. The spider can have three equally spaced spider legs for supporting the inner hub. The profile in some embodiments can be a pipe.

The present invention can also provide a spider for an extrusion apparatus upstream from a die for extruding pipe including an outer housing with a central flow passage therethrough. An inner hub can be positioned within the central passage for supporting an inner portion of the die. A plurality of spaced spider legs can be secured to the outer housing and the inner hub, and support the inner hub within the central passage. The spider legs can be angled radially rearwardly outwardly in the downstream direction such that molten polymer flowing through the central passage flows around the spider legs, separating and rejoining together earlier in inner radial regions close to the inner hub and subsequently progressively continuing moving radially outward to outer radial regions close to the outer housing for reducing spider lines on inside surfaces of extruded pipe. The spider legs can have upstream and downstream edges which are angled radially rearwardly outwardly in the downstream direction at the same angle relative to a flow direction axis.

The present invention can also provide a method of reducing spider lines in a profile extruded through a die having an inner die portion supported by a spider positioned upstream from the die. The spider can have an outer housing with a central flow passage therethrough. An inner hub can be positioned within the central passage for supporting the inner die portion. The inner hub can be supported within the central passage with at least one spider leg secured to the outer housing and the inner hub. The at least one spider leg can recess radially rearwardly outwardly in the downstream direction such that molten polymer flowing through the central passage flows around the at least one spider leg, separating and rejoining together earlier in inner radial regions close to the inner hub than in outer radial regions close to the outer housing for reducing spider lines on inside surfaces of the profile.

In particular embodiments, the at least one spider leg can recess radially rearwardly outwardly in a configuration to separate and rejoin molten polymer starting earlier in the inner radial regions and subsequently progressively continuing moving radially outward to the outer radial regions. Upstream and downstream edges of the at least one spider leg can be angled radially rearwardly outwardly in the downstream direction at the same angle relative to a flow direction axis. The at least one spider leg can have a longitudinal flow direction length between the angled upstream and downstream edges that is generally constant at any radial location of the at least one spider leg. The upstream and downstream edges can be pointed for reducing flow resistance. The inner hub can be supported with three equally spaced spider legs. The spider lines can be reduced in an extruded pipe.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1 and 2 depict side sectional and end views of an extrusion apparatus head assembly having an embodiment of a spider in accordance with the present invention, the sectional view of FIG. 1 being taken along lines 1-1 of FIG. 2.

DETAILED DESCRIPTION

Figure 3:
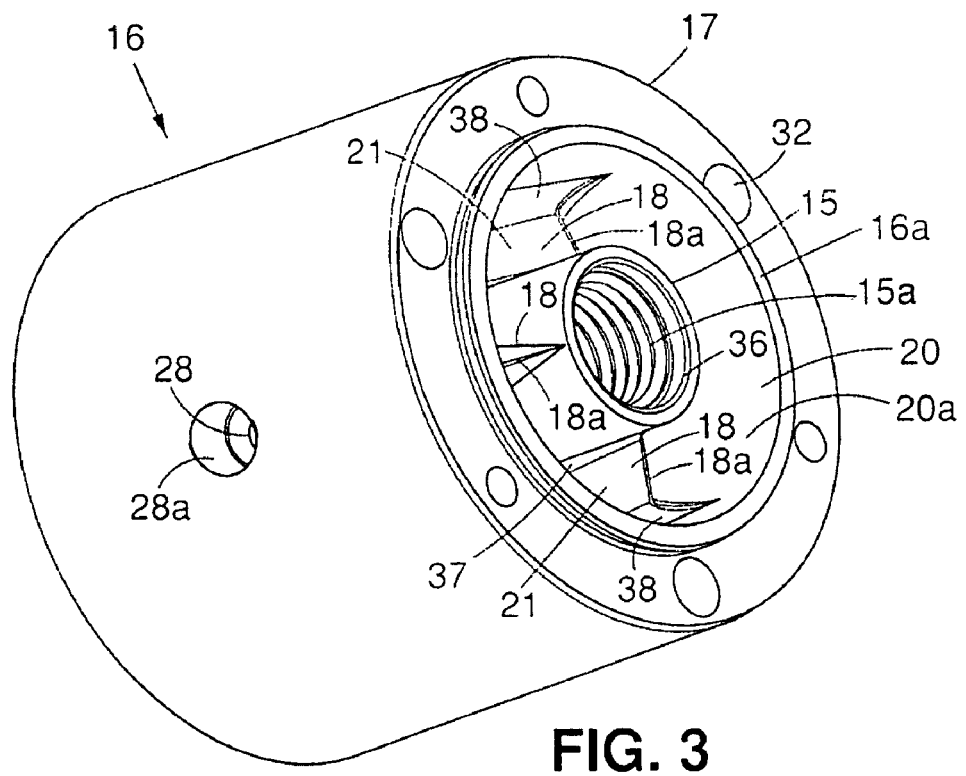
FIG. 3 is a perspective view of the upstream end of the spider of FIG. 1.
Figure 4:
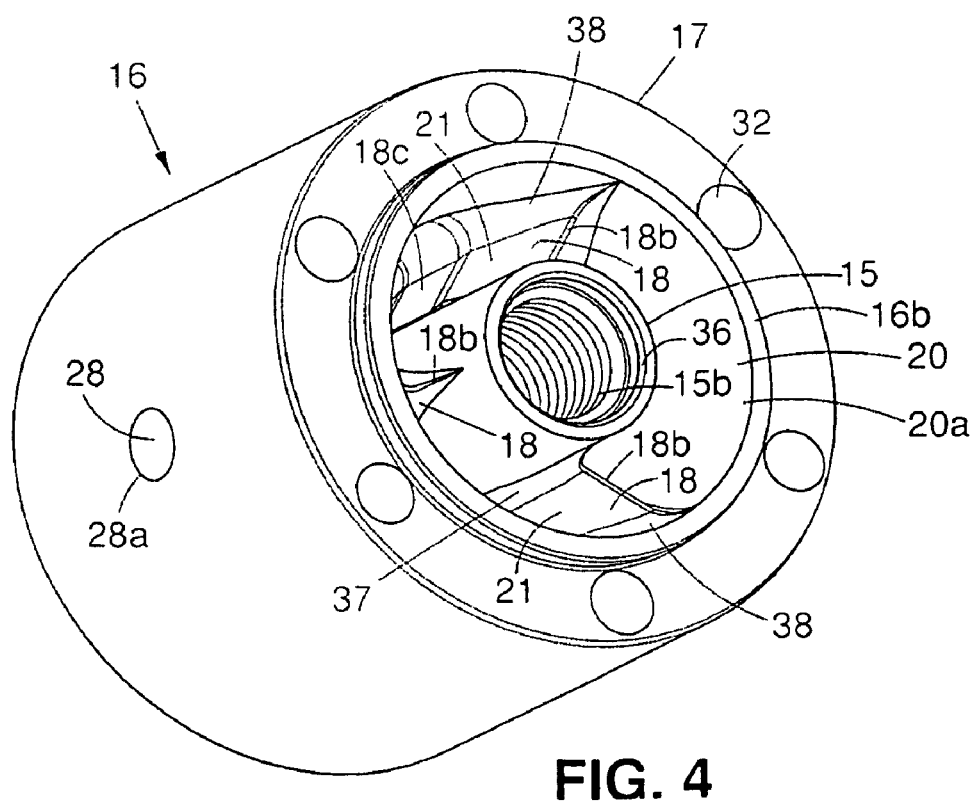
FIG. 4 is a perspective view of the downstream end of the spider of FIG. 1.
Figure 5:
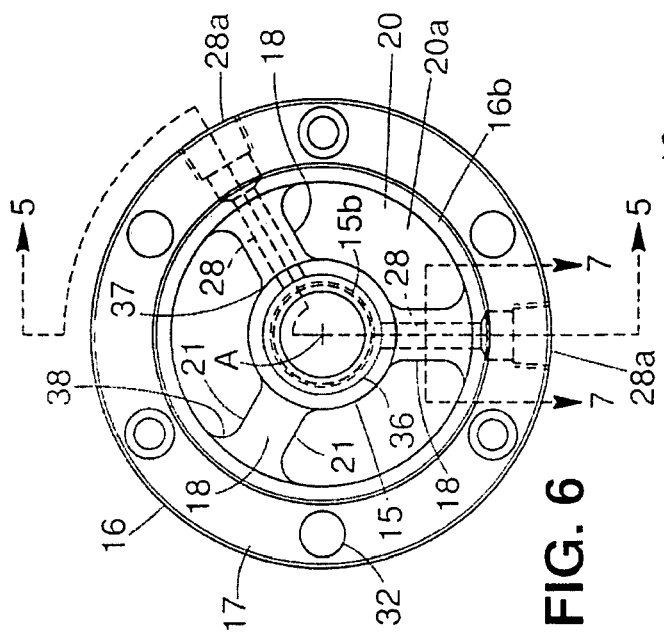
FIG. 5 is a side sectional view of the spider of FIG. 1 taken along lines 5-5 in FIG. 6.

Referring to FIGS. 1-8, spider or spider pipe 16 can be employed in a plastic extrusion apparatus 10 for extruding profiles such as plastic pipe, for example, PVC pipe. The spider 16 can be positioned inline with passage 11 of extrusion apparatus 10 between upstream and downstream members or portions 10a and 10b along longitudinal flow axis A. Upstream member 10a can have an upstream passage portion 11a connected to the upstream end 16a of spider 16, and downstream member 10b can have a downstream passage portion 11b connected to the downstream end 16b of spider 16. The spider 16 can be upstream of an extrusion die 14 having inner 14a and outer 14b die portions, and secured in place by bolts 34 through holes 32 positioned along a circumferential bolt circle. The inner 14a and outer 14b die portions can form an extrusion gap 14c therebetween, through which molten polymer 12 is extruded to form a desired profile, such as a pipe. The extrusion gap 14c is shown to be circular, but can be any suitable shape. The gap 14c can be adjusted with an adjustment mechanism, device, apparatus or arrangement 13.

The spider 16 can have a cylindrical outer wall, ring or housing 17 surrounding a central flow cavity or passage 20 for receiving molten polymer 12, and can support the inner die portion 14a of the extrusion die 14 along the flow direction and longitudinal axis A. The central flow passage 20 can be generally circular or round. A central or inner hub 15 can be positioned in the center or along the longitudinal axis A of the central flow passage 20 for supporting the inner die portion 14a along longitudinal axis A, and can be generally rod or cylindrical shaped, and elongate. Consequently, the positioning of the inner hub 15 within the central flow passage 20 can form a generally annular flow path or passage 20a through the spider 16. The inner hub 15 can have an upstream female threaded hole 15a for securing a contoured, pointed or generally cone shaped flow member 19 by engaging a male threaded stem or member 22. The inner hub 15 can also have a downstream female threaded hole 15b for securing the inner die portion 14a by engaging a male threaded stem or member 24 at the base 26 of inner die portion 14a. The flow member 19 and the base 26 of the inner die portion 14a can be shaped to provide a smooth flow transition with the inner hub 15 once tightened thereto.

The inner hub 15 can be supported by a plurality of fin shaped spider webs struts, supports, members or legs 18, for example, three equally spaced spider legs 18 (120° apart). The spider legs 18 can be integrally formed, connected, secured or extended between the outer ring 17 and the inner hub 15. The longitudinal flow direction length L of the spider legs 18 along or parallel to the longitudinal axis A can be greater than the thickness or width W. The spider legs 18 can have a midsection 18c and have pointed or reduced thickness contoured upstream 18a and downstream 18b edges for reduced flow resistance as the polymer 12 separates to flow around the spider legs 18 while flowing through central flow passage 20. The polymer 12 flowing around the sides 21 of the spider legs 18 recombines before flowing through the die 14.

Figure 9:
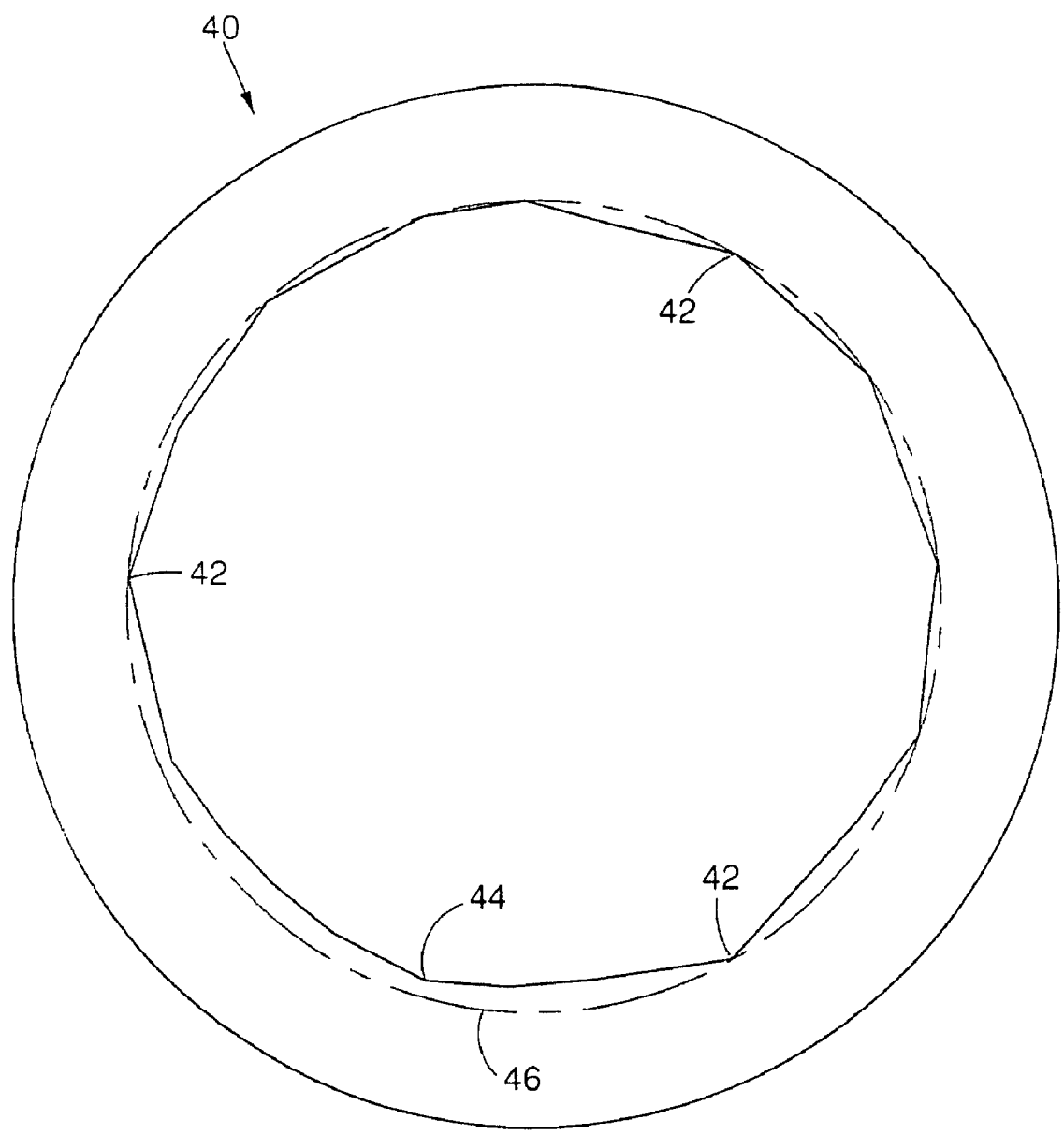
FIG. 9 is a schematic representation of spider lines on an extruded profile or pipe.
Figure 10:
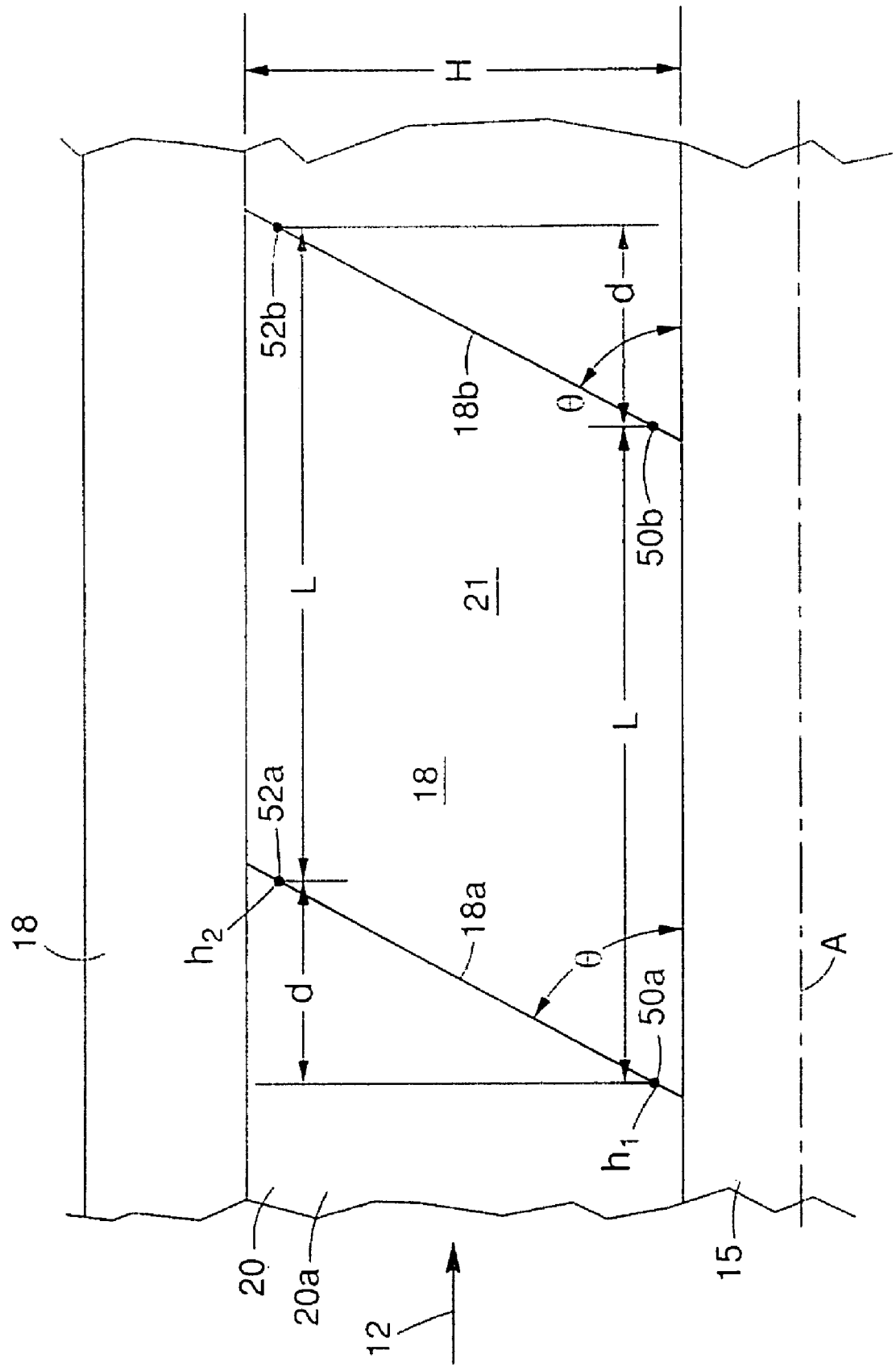
FIG. 10 is a schematic drawing of an angled spider leg.

FIG. 9 shows a profile 40 such as a pipe having an inner surface 44 with spider lines 42, and a round theoretical inner surface 46 for comparison. In order to prevent or reduce spider lines 42 on the inner surface 44 in an extruded profile 40, such as a PVC pipe, the upstream edge 18a of the spider legs 18 can be progressively inclined, recessed, directed, extended or angled backwardly or radially rearwardly outwardly in the downstream direction. This radial outward direction, is radially outward relative to the longitudinal axis A. The backwardly directed angled upstream edge 18a of the spider legs 18 can progressively radially outwardly cut, split or separate the flow of the molten polymer 12 flowing around the spider legs 18 through the central flow passage 20 along longitudinal axis A. Such progressive cutting by the backwardly outwardly angled upstream edge 18a can in some cases more easily cut through the molten polymer 12 than a straight or vertical upstream edge. In addition, the downstream edge 18b can be directed or angled backwardly or radially rearwardly outwardly in the downstream direction by the same amount or angle θ (FIG. 10). The backwardly directed or angled spider legs 18 allow the molten polymer 12 flowing around the spider legs 18 to separate at the upstream edge 18a and rejoin or recombine on the downstream edge 18b first or earlier in the generally central or inner radial regions of the central flow passage 20 at, close to, near, or around the inner hub 15. The molten polymer 12 flowing past the backwardly directed or angled spider legs 18 at radially outward locations of the central flow passage 20, moving towards, at or closer to the outer ring 17, separates and rejoins progressively, subsequently and sequentially later, as the molten polymer 12 flows longitudinally past the spider legs 18. This can provide a smoother transition of flow around the spider legs 18 to reduce spider lines and obtain an inner surface approaching or similar to theoretical surface 46.

Figure 7:
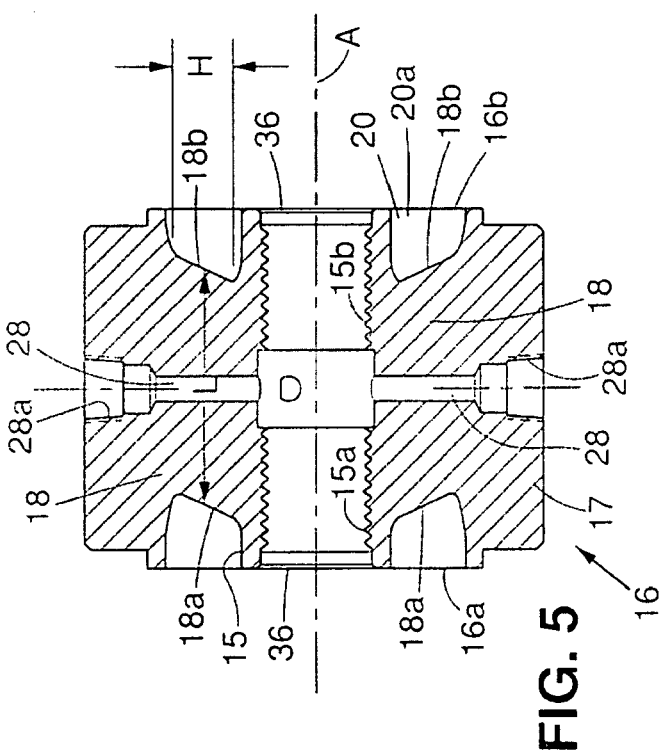
FIG. 7 is a section of a spider leg taken along lines 7-7 in FIG. 6.
Figure 8:
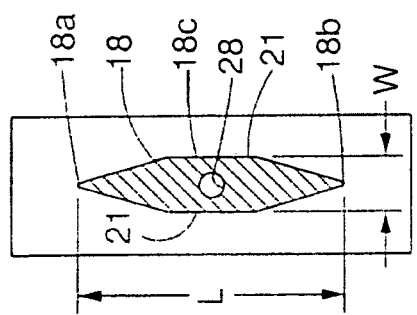
FIG. 8 is a side view of the spider in FIG. 6.

Referring to FIG. 10, when the upstream 18a and downstream 18b edges are angled at the same angle θ relative to longitudinal axis A, the distance between the upstream 18a and downstream 18b edges along or parallel to the longitudinal axis A, forms a longitudinal flow direction length L which is generally constant over the radial height H or at any radial location on the spider legs 18. As a result, the molten polymer 12 flows over an equal amount of longitudinal flow direction length L of the spider legs 18 along longitudinal axis A, regardless of the radial location or height on the spider legs 18 or position within central flow passage 20. This can provide a consistent flow speed, friction and temperature along different radial locations on the spider legs 18 which can aid in providing a consistent extruded profile with reduced spider lines. Spider legs that have different longitudinal flow lengths at different radial locations can result in inconsistent flow rate, friction and temperature of the molten polymer. Furthermore, as can be seen in FIG. 7, the opposing sides 21 of the spider legs 18 can have surfaces that have the same shape so that the molten polymer 12 will have the same or similar flow characteristics on both sides 21.

In some embodiments, the molten polymer 12 flowing around the sides 21 of the spider legs 18 can rejoin together in the central or radially inward regions of the central flow passage 20, at or close to the inner hub 15, between about 1 or 2 inches earlier or further upstream, or about 0.5 to 0.1 or 0.5 to 2 seconds faster, than the molten polymer 12 rejoining at the radially outward regions, at or close to the outer ring 17. This can be illustrated in FIG. 10, where the upstream 18a and downstream 18b edges of a spider leg 18 are shown angled at the same angle θ. The longitudinal flow direction length L is the same at different radial locations, positions or heights on the spider leg 18, such as at $h_1$ and $h_2$. Radial height $h_1$ is shown located close to the inner hub 15 at a radially inward region, and the radial height $h_2$ is shown close to the outer ring 17 at a radially outward region. Molten polymer 12 flowing through the central flow passage 20 can separate at radial height $h_1$ at point 50a on upstream edge 18a and rejoin at point 50b on downstream edge 18b, and can separate at radial height $h_2$ at point 52a on upstream edge 18a, and rejoin at point 52b on downstream edge 18b. As can be seen, the molten polymer 12 flowing in the direction of longitudinal axis A separates at the upstream edge 18a, first or earlier at radial height $h_1$ or point 50a, by a distance d before separating at radial height $h_2$ or point 52a, and also rejoins at the downstream edge 18b first or earlier at radial height $h_1$ or point 50b, by a distance d before rejoining at radial height $h_2$ or point 52b. It is understood that molten polymer 12 will separate and rejoin later at any radially outward location or region relative to any radially inward location or region, or conversely, separate and rejoin first or earlier at any radially inward location or region relative to any radially outward location or region. The separating and rejoining of the molten polymer 12 starts first or earlier at the inner radial regions, and subsequently progressively continues moving downstream and radially outward relative to longitudinal axis A to the outer radial regions on spider leg 18. The extra length, distance or time that molten polymer 12 can mix, before or earlier, at or near the radially inward regions of central flow passage 20 to recombine or mix together, allows the molten polymer 12 to recombine or mix together more completely at those regions than at or near the radially outward regions, that mix subsequently or later. Also, the backwardly outwardly angled upstream 18a and/or downstream 18b edges of the spider legs 18 can in some cases, direct some molten polymer 12 radially outwardly, and cause another mixing action, which starts earlier at inner radial regions close to the inner hub 15. As a result, when the molten polymer 12 passes through the die 14, the molten polymer 12 in the radially inward locations of central flow passage 20 when extruded through the die 14, is on the inner surface of the extruded pipe and is more completely recombined or mixed, resulting in reduced weld or spider lines. Since the wall thickness of extruded pipe is measured at the thinnest location, which is at the spider lines, a pipe with spider lines contains more polymer than in a pipe with reduced spider lines. Therefore, a pipe with reduced spider lines has a more consistent wall thickness and uses less material, resulting in cost savings.

Figure 6:
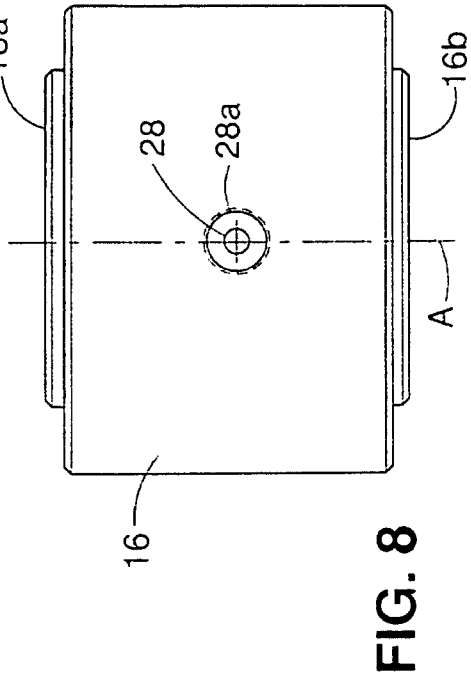
FIG. 6 is an end view of the spider of FIG. 6.

In one embodiment of the spider 16, the outer ring 17 can have a diameter of about 5 inches. The central flow passage 20 can be about 4.3 inches long and about 3.3 inches in diameter. The radial height H of the spider legs 18 can be about ⅞ inches and the upstream 18a and downstream edges 18b of the spider legs 18 can be at about a 60° angle relative to longitudinal axis A. The upstream 18a and downstream 18b edges can also be pointed about 35° on the side surfaces, as seen in FIG. 7. It is understood that other suitable angles other than 60° and 35° can be employed. The longitudinal flow direction length L of the spider legs 18 along or parallel to longitudinal axis A, can be about 2.9 or 3 inches long. The upstream edge 18a of the spider legs 18 at the location joining the inner hub 15 can be recessed within the central flow passage 20, and the downstream edge 18b at the location joining the inner hub 15 can be recessed a greater distance due to the angle of the downstream edge 18b. The spider legs 18 can join the inner hub 15 with a radius 37, and can join the outer ring 17 with a radius 38 (FIG. 6). Radius 37 and Radius 38 can be about ¼ inch. The inner hub 15 can have a diameter of about 1.5 inches and can be the same length as the central passage 20. The female threaded holes 15a and 15b in the inner hub 15 can be M30×3.5-6H threads about 1½ inches deep. A counterbore about 1¼ inches in diameter and about 0.2 inches deep can be located at the entrance of the threaded holes 15a and 15b for engaging with locating diameters 22a and 26a of the flow member 19 and base 26 of the inner die portion 14a. The upstream 16a and downstream 16b ends of the spider 16 can have a shoulder or lip which can be about 3.6 inches in diameter, can protrude about 0.2 inches, and can aid in aligning and sealing the spider 16. One or more bore holes 28 can extend through the outer ring 17 into the inner hub 15 through one or more of the spider legs 18. The bore holes 28 can include a threaded hole 28a in the outer ring 17 into which a plug 30 can be secured. The bore holes 28 can be used for supply lines, such as power and/or control lines to devices or instruments, for example, for temperature probes, heating elements, pressure sensors, etc. The bores 28 can be about 0.3 inches in diameter and the threaded hole 28a can be a ⅜ pipe thread.

Although the upstream 18a and downstream 18b edges of the spider legs 18 have been shown angled, in some embodiments, the edges 18a and 18b can recess with other suitable configurations, such as with curves. The amount of rearward recession, formed by angling and/or curving or other configurations, does not have to be constant. In addition, more or less than three spider legs 18 can be employed (at least one), for example, one, two, four, etc. Furthermore, depending upon the situation at hand, it is understood that a range of different dimensions are contemplated for different sized spiders 16, or for different features. Also, the spider 16, central flow passage 20 and inner hub 15 do not have to be round in cross section but can have other suitable shapes.

While this invention has been particularly shown and described with references to example embodiments thereof, it will be understood by those skilled in the art that various changes in form and details may be made therein without departing from the scope of the invention encompassed by the appended claims.

What is claimed is:

1. A spider for an extrusion apparatus upstream from a die for extruding a profile comprising:
    an outer housing with a central flow passage therethrough;
    an inner hub positioned within the central passage for supporting an inner portion of the die; and
    at least one spider leg secured to the outer housing and the inner hub, and supporting the inner hub within the central passage, the at least one spider leg recessing radially rearwardly outwardly in the downstream direction such that molten polymer flowing through the central passage flows around the at least one spider leg, separating and rejoining together earlier in inner radial regions close to the inner hub and subsequently progressively continuing moving radially outward to outer radial regions close to the outer housing for reducing spider lines on inside surfaces of extruded profiles, the at least one spider leg has upstream and downstream edges which are recessed radially rearwardly outwardly in the downstream direction and relative to polymer flow path through the central flow passage.

2. The spider of claim 1 in which the at least one spider leg has upstream and downstream edges which are angled radially rearwardly outwardly in the downstream direction at the same angle relative to the polymer flow path.

3. The spider of claim 2 in which the at least one spider leg has a longitudinal flow direction length between the angled upstream and downstream edges that is constant.

4. The spider of claim 3 in which the upstream and downstream edges are pointed for reduced flow resistance.

5. The spider of claim 4 in which three equally spaced spider legs support the inner hub.

6. A spider for an extrusion apparatus upstream from a die for extruding pipe comprising:
    an outer housing with a central flow passage therethrough;

an inner hub positioned within the central passage for supporting an inner portion of the die; and a plurality of spaced spider legs secured to the outer housing and the inner hub, and supporting the inner hub within the central passage, the spider legs being angled radially rearwardly outwardly in the downstream direction such that molten polymer flowing through the central passage flows around the spider legs, separating and rejoining together earlier in inner radial regions close to the inner hub and subsequently progressively continuing moving radially outward to outer radial regions close to the outer housing for reducing spider lines on inside surfaces of extruded pipe, the spider legs having upstream and downstream edges which are angled radially rearwardly outwardly in the downstream direction at the same angle relative to polymer flow path through the central flow passage.

* * * * *